United States Patent
Golder

(10) Patent No.: US 10,112,810 B2
(45) Date of Patent: Oct. 30, 2018

(54) LIFTING HOIST WITH HYSTERESIS CLUTCH

(71) Applicant: Konecranes Global Corporation, Hyvinkää (FI)

(72) Inventor: Markus Golder, Künzelsau (DE)

(73) Assignee: R. Stahl Schaltgerate GmbH, Waldenburg (DE)

( * ) Notice: Subject to any disclaimer, the term of this patent is extended or adjusted under 35 U.S.C. 154(b) by 35 days.

(21) Appl. No.: 15/117,250

(22) PCT Filed: Feb. 9, 2015

(86) PCT No.: PCT/EP2015/052652
§ 371 (c)(1),
(2) Date: Aug. 8, 2016

(87) PCT Pub. No.: WO2015/121203
PCT Pub. Date: Aug. 20, 2015

(65) Prior Publication Data
US 2016/0347593 A1 Dec. 1, 2016

(30) Foreign Application Priority Data
Feb. 11, 2014 (DE) .......... 10 2014 101 655

(51) Int. Cl.
| B66D 1/58 | (2006.01) |
| H02K 49/06 | (2006.01) |
| H02K 7/11 | (2006.01) |
| B66D 3/22 | (2006.01) |
| H02K 7/116 | (2006.01) |

(52) U.S. Cl.
CPC .......... B66D 1/58 (2013.01); B66D 3/22 (2013.01); H02K 7/11 (2013.01); H02K 49/065 (2013.01); *H02K 7/116* (2013.01)

(58) Field of Classification Search
CPC ... B66D 1/58; B66D 1/16; B66D 3/22; H02K 7/11; H02K 49/065; H02K 7/116
USPC .......................................................... 254/346
See application file for complete search history.

(56) References Cited

U.S. PATENT DOCUMENTS

| 1,749,060 | A | * | 3/1930 | Beaumont | B66D 1/16 192/84.1 |
| 1,779,480 | A | * | 10/1930 | Loomis | E21B 19/08 254/275 |
| 1,925,474 | A | * | 9/1933 | Wilsing | B66D 1/24 188/171 |
| 2,009,889 | A | * | 7/1935 | Hild | B66C 13/23 192/114 R |

(Continued)

*Primary Examiner* — Michael E Gallion
(74) *Attorney, Agent, or Firm* — Leydig, Voit & Mayer, Ltd.

(57) ABSTRACT

A lifting hoist (10) having a drive train (14) containing a slip clutch arrangement (23) with a hysteresis clutch (26). The drive train (14) transfers torque, friction-free, in both forward and backward directions of movement between the motor (15) and a gearing (16). The hysteresis clutch (23) forms an unbranched torque transmission path between the motor (15) and the gearing (16). The hysteresis clutch (26) acts as a vibration damper, allows controlled emergency load lowering, and acts as a secure torque limiter in emergency malfunctions when lowering a load. It further can be used as a load indicator by reducing the load-lifting speed before the nominal load is reached or in the event of an overload.

14 Claims, 3 Drawing Sheets

(56) References Cited

U.S. PATENT DOCUMENTS

| | | | | |
|---|---|---|---|---|
| 2,020,631 A * | 11/1935 | Becker | ............... | B66C 11/20 212/77 |
| 2,416,638 A * | 2/1947 | Morton | ............... | B66D 5/026 188/280 |
| 2,587,638 A * | 3/1952 | Meier | ............... | E21B 19/08 173/10 |
| 2,652,230 A * | 9/1953 | Hoyle | ............... | B66C 13/26 254/346 |
| 2,881,882 A * | 4/1959 | Gentile | ............... | B66C 13/26 192/12 D |
| 3,510,107 A * | 5/1970 | Fidler | ............... | B64D 1/22 244/137.4 |
| 3,573,518 A * | 4/1971 | Liles | ............... | H02K 49/065 310/103 |
| 3,687,236 A * | 8/1972 | Caputo | ............... | B66B 1/52 187/293 |
| 3,788,606 A * | 1/1974 | Solter | ............... | B66D 1/48 254/290 |
| 4,402,470 A * | 9/1983 | Hamayasu | ............... | A01K 89/01555 242/223 |
| 4,420,917 A * | 12/1983 | Parlanti | ............... | E04H 12/34 254/346 |
| 4,449,317 A * | 5/1984 | Brodribb | ............... | A01K 89/02 192/15 |
| 4,504,023 A * | 3/1985 | Lauritzen | ............... | H01F 41/094 242/390.9 |
| 4,714,208 A * | 12/1987 | Holahan | ............... | A01K 89/01555 242/288 |
| 5,523,636 A * | 6/1996 | Nelson | ............... | H02K 7/10 310/103 |
| 5,631,511 A * | 5/1997 | Schulmann | ............... | C30B 15/30 117/13 |
| 7,891,641 B1 * | 2/2011 | Miller | ............... | B66D 1/16 254/344 |
| 7,984,894 B1 * | 7/2011 | Chauza | ............... | B66D 1/16 254/344 |
| 8,550,435 B2 * | 10/2013 | Gonen | ............... | G02B 6/4464 254/134.3 R |
| 9,099,148 B2 * | 8/2015 | Manes | ............... | G11B 15/6835 |
| 2014/0131646 A1 * | 5/2014 | Richardson | ............... | B66D 1/12 254/362 |
| 2016/0347592 A1 * | 12/2016 | Golder | ............... | H02K 49/065 |

\* cited by examiner

LIFTING HOIST WITH HYSTERESIS CLUTCH

CROSS-REFERENCE TO RELATED APPLICATIONS

This patent application is the national phase of PCT/EP2015/052652, filed Feb. 9, 2015, which claims the benefit of German Patent Application No. DE 10 2014 101 655.6, filed Feb. 11, 2014, which is incorporated by reference.

FIELD OF THE INVENTION

The present invention relates generally to hoists, and more particularly to hoists having a drive train with a frictionless slip clutch arrangement.

BACKGROUND OF THE INVENTION

Hoists commonly have slip clutches in the drive train in order to prevent an overloading of pulling means or elements, gearing or other components of the hoist, or of supporting structures that hold the hoist. Also, in case of an operating error such as, for example, when a load becomes hung up on an obstacle when the load is being moved upward, damage to the chain pulley block, or any other danger situations must not occur. This also applies when the hoist is used in a horizontal operating mode, for example, for driving a chassis or a carriage.

U.S. Pat. No. 3,573,517 discloses a hoist having a drive train comprising a motor, a gearing, and an interposed slip clutch arrangement. A brake is provided on the gearing side, the brake being configured as a so-called load pressure brake. The load applies a torque to a gearing output shaft via a pulling means and its winding wheel. This torque is used to displace the brake shoes of the brake into the direction of engagement so that the load continues to be held safely while the motor is being deenergized.

The slip clutch arrangement comprises a parallel arrangement of a hysteresis clutch and an overrunning clutch. When the load is being moved upward, the brake is released and the overrunning clutch is inactive. The torque transmitted by the hysteresis clutch is greater than the nominal load torque so that the load is moved upward in a non-slip, positive manner.

When the load is being lowered, the overrunning clutch engages. The clutch effects a non-torsional connection between the motor and the gearing input shaft. Now, by means of the force of the motor, the holding torque of the load pressure brake is overcome and the load is moved downward. Consequently, the hysteresis clutch is disposed to act as a safeguard against overloading. If a constant slippage occurs on said clutch, a thermoswitch is actuated in order to stop the drive.

In addition to loads being hung up, it is possible for other disadvantageous operating situations to occur, thus requiring that such conditions be prevented or that its effects minimized. For example, due to resonance stimulation as a result of the polygonal effect of the chain wheel, it is possible for a chain vibration to occur, with the vibration overloading or wearing the supporting structures, structural components or even the gearing of the chain pulley block. The occurrence of such vibrations must be counter-acted.

Furthermore, during switching on and switching off operations, as well as when the rotational speed is changed in the case of pole-changeable mains-controlled motors, rotational speed surges occur on the motors, with such surges potentially leading to a shock-like stress on the pulling means and the gearing. This also must be avoided.

In particular in the case of inverter-controlled drives, high safety requirements must be satisfied in the construction of inverters. In any event, the occurrence of uncontrolled movement of a load if the inverter is defective or its control is malfunctioning must be prevented. In this case, measures are desirable that can minimize or prevent any danger to man, machine and environment with great reliability and at low cost.

OBJECTS AND SUMMARY OF THE INVENTION

It is the object of the invention to provide an improved hoist for moving loads that is adapted for more problem free operation.

The hoist in accordance with the invention includes a drive train with a slip clutch arrangement that forms an unbranched torque gearing path created by a hysteresis clutch. The term "unbranched" as used herein means a drive train in which the hysteresis clutch provides a direct coupling in the drive train path without any clutches arranged in parallel to each other such as in the afore referenced U.S. Pat. No. 3,573,517. There is no bypass path on which the torque could be transmitted bypassing the hysteresis clutch. Consequently, the hysteresis clutch is active during the forward rotation (lifting of the load) as well as during the reverse rotation (lowering of the load). It is free of mechanical friction. If said clutch operates in an oil bath, it is possible—in addition to the torque due to hysteresis—for a torque to be transmitted due to fluid dynamics. In addition, vortical flows in the hysteresis clutch are able to transmit a torque. However, parallel to the hysteresis clutch, no additional clutch element is provided or active.

Due to the aforementioned measure it is possible to achieve considerable advantages:

If the load suspended from the pulling means begins to vibrate, torque vibrations occur in the drive train. Due to these vibrations, the hysteresis clutch moves into slippage mode as soon as a torque limit is exceeded. In doing so, the torque limit is that torque at which the hysteresis clutch passes from slippage-free operation into slippage operation. Slippage is defined as one minus the quotient of the output rotational speed and the input rotational speed of the clutch. The torque limit may be set above the nominal load torque or also below the nominal load torque. In the latter case the vibration absorption is particularly efficient. However, a vibration absorption occurs also in the first-mentioned case so that an overloading of the hoist and of the supporting structures can be prevented.

Furthermore, the hysteresis clutch is able to absorb load shocks that can be caused by a hung up load, such as by a surge-like start of the motor or by surge-like changes of the rotational speed of the motor. This is particularly effective when the torque limit is set lower than the nominal torque. However, the damping effect also occurs when the setting is made otherwise.

Furthermore, the subject invention allows the construction of safety-oriented hoists, in particular inverter driven-hoists, at relatively low cost. A safety-oriented emergency push button shutoff circuit can be used for engaging the load pressure brake. Even at the maximum torque of the motor, the hysteresis clutch transmits only a limited torque from the motor to the gearing, so that, in the case of a malfunction of the inverter control or the inverter, a continued operation of the motor is of no consequence. Regardless of whether it continues to operate in forward or in reverse, the load can be stopped via the brake provided on the gearing side. It is useful for the damping of vibrations, as well as for safety, that the slip clutch arrangement exhibits a symmetrical torque/slippage characteristic in view of the forward direction of rotation and the reverse direction of rotation.

Preferably, the at least one brake is arranged on the gearing side and is electrically released. Consequently, the brake can be released while loads are being lifted, as well while they are being lowered, thus allowing an efficient operation of the hoist with a low loss of energy. Safety aspects are satisfied in that the brake is electrically actively released and applied by a return spring. As soon as the electrical circuit becomes deenergized for releasing the brake, the brake is applied under spring force. In doing so, the brake generates a defined, load-independent brake torque. The torque may be designed such that the maximum brake torque Mmax corresponds to a fictitious load Fmax that is greater than the nominal load Fnom. When the lifting pull becomes idle, the brake automatically sets in (i.e., it is applied due to the action of the spring force) and the load cannot drop in an uncontrolled manner.

It is possible to design the brake in such a manner that its maximum brake torque Mmax is at least as great as the sum of a nominal load torque Mnom and a driving torque MAntr. The driving torque MAntr is that torque that can be input by the motor and the slip clutch arrangement into the drive train. Consequently, the brake can apply the torque Mnom applied by the load, as well as the driving torque MAntr applied by the drive. Under these conditions, it is possible to construct simple, safety-oriented hoists, wherein only the brake control is subject to special safety requirements, and wherein the motor control, as well as optionally provided power inverters satisfy lower safety requirements. The brake is able to hold the load even when the motor is rotating uncontrolled in any direction, while the hysteresis clutch limits the transmitted toque to a value that can still be safely absorbed by the brake. Should such an error status continue to exist, the mechanically contactless-operating hysteresis clutch may reach a temperature at which one or more permanent magnets become weaker or will be demagnetized entirely. In doing so, the torque gearing is attenuated or interrupted. Any additional heating or dangerous overheating of the drive is thus prevented. This applies to hoists with inverter-driven motors as well as to hoists with motors connected to mains.

With the at least one brake arranged on the gearing side it is possible—as has already been mentioned—for the slip clutch arrangement to exhibit a torque limit Mgrenz at which the clutch begins to slip and which is lower than a nominal torque Mnom that occurs with the nominal load Fnom. In addition to the aforementioned advantages, it is also possible to perform a manual lowering of the load when the motor is blocked in that when the motor is blocked, the brake is released and the hysteresis clutch is adjusted, e.g., manually, to an extent that a controlled lowering of the load is possible. In doing so, the hysteresis clutch acts as a hysteresis brake.

Alternatively or additionally, the brake may also be arranged on the motor side of drive train. In this case, the torque limit Mgrenz of the slip clutch arrangement is preferably set in such a manner that it is greater than the nominal torque Mnom occurring with the nominal load Fnom.

Alternatively, it is also possible to provide two or more brakes on both sides of the slip clutch arrangement, i.e., on the motor side as well as on the gearing side.

Other objects and advantages of the invention will become apparent upon reading the following detailed description and upon reference to the drawings.

Figure 1:
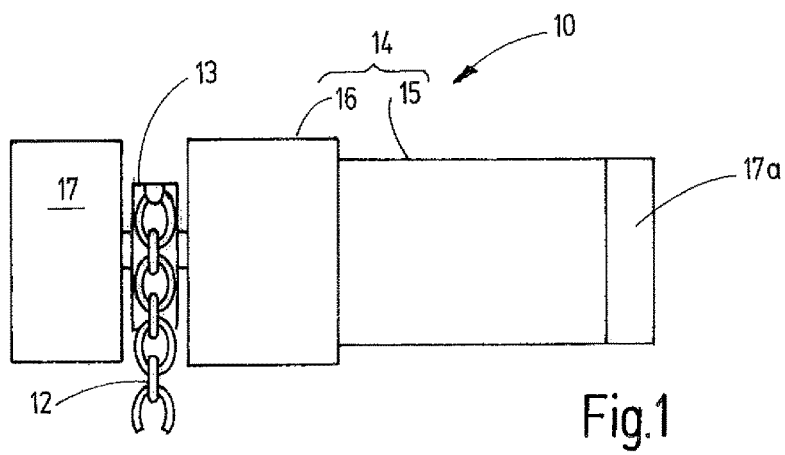
FIG. 1 is a schematic of an illustrative hoist in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Figure 2:
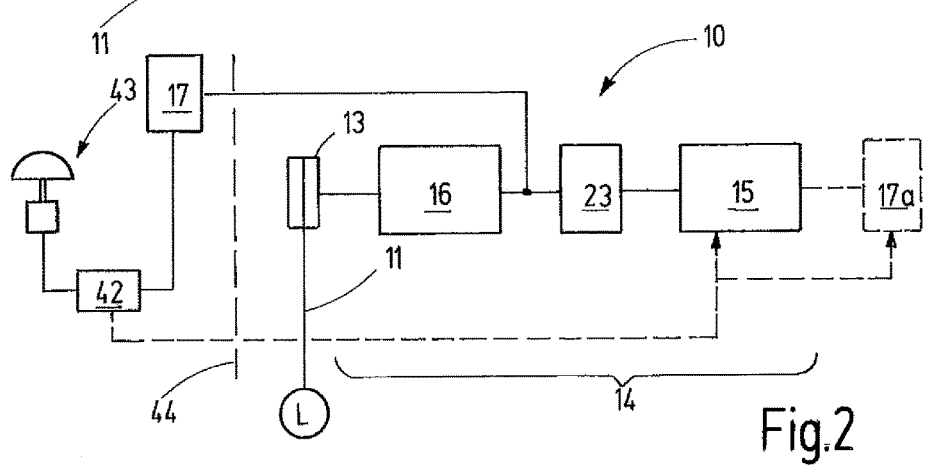
FIG. 2 is a block circuit diagram of the hoist shown in FIG. 1.

Referring more particularly to the drawings, there is shown an illustrative hoist 10 in accordance with the invention which may be part of a crane, a crane system or the like. The hoist 10 is disposed for lifting loads L (FIG. 2) by means of a pulling means or element 11 configured, for example, as a round-link chain 12, another chain, a rope or the like, or for moving such loads in another way. To do so, the chain 12 moves over a pocket wheel 13 that is connected to the output side of a drive train 14. The drive train 14 comprises a motor 15, preferably an electromotor, as well as, preferably, a gearing 16. The motor 15 may be an asynchronous motor, a synchronous motor or another electromotor, a hydraulic motor, compressed air motor or another driving source. In the simplest case, it may be a mains-operated motor that can be switched on and off and has a single fixed rotational speed (for example 1500 rpm or 3000 rpm). Alternatively, as a mains-operated motor, the motor 15 may assume several rotational speeds by pole switching. In a particularly convenient embodiment, the motor 15 is driven at variable rates of revolution with the use of an inverter.

The gearing 16 can be a reduction gear that transforms a high rate of revolutions of the motor into a low rate of revolutions of the pocket wheel 13 or any other driving wheel for the pulling means 11 in order to move loads. Preferably, the gearing 16 is a non-self-locking toothed gearing.

Figure 3:
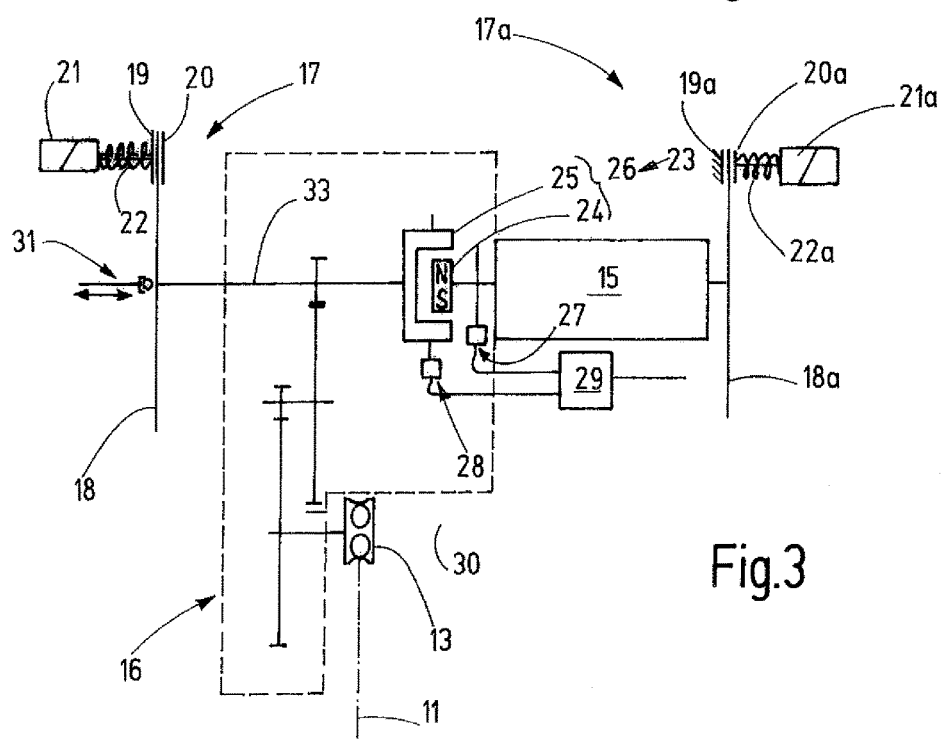
FIG. 3 is a more detailed schematic of the illustrated hoist.

The drive train 14 in this instance is connected to a gearing-side brake 17. The brake 17 may be connected to the pocket wheel 13, another winding wheel or another drive shaft. Preferably, as depicted in FIG. 3, the brake 17 is a disk brake with a brake disk 18 that is associated with brake blocks 19, 20. Preferably, these are tensioned by the force of a return spring 22 toward the brake disk 18. They may be released by one or more electromagnets 21 in order to disengage the brake disk 18. In doing so, the brake disk 18 is blocked in deenergized state. The occurring maximum braking torque Mmax, in doing so, is at least greater than the torque to be generated by the load L.

As depicted in FIG. 3, the gearing 16 is a reduction gear. The drive train 14 comprises a slip clutch arrangement 23. As shown in an exemplary manner in FIGS. 2 and 3, the clutch arrangement 23 may be arranged, for example, between the motor 15 and the gearing 16. Preferably, the slip clutch arrangement 23 is a hysteresis clutch 26 without mechanical connection between its motor-side clutch half 24 connected to the motor output shaft and its gearing-side clutch half 25 connected to the gearing input shaft. The two clutch halves 24, 25 form a hysteresis clutch 26 without bypass clutching. The hysteresis clutch 26 transmits torques in forward direction of rotation as well as in reverse direction of rotation of the motor 15. Preferably, the hysteresis clutch 23 has a cylindrical air gap that is included between the clutch halves 24, 25. The torque transmitted by the hysteresis clutch 26 is generated mainly by the hysteresis effects in one of the clutch halves 24, 25. Additional torque contributions can be provided by vortical current effects and, optionally, fluid-mechanical effects. The latter is true, in particular, when the hysteresis clutch 26 operates in the oil bath.

Optionally, the clutch halves 24, 25 may be connected to a rotational speed sensor, i.e., in the simplest case a centrifugal switch. Alternatively, it is also possible for both clutch halves 24, 25 to be connected to rotational speed sensors 27, 28, each of them generating a signal corresponding to the rotational speed of the clutch half halves 24 and 25, respectively. The signals may be switching signals, analog signals or digital signals that characterize the rotational speeds and/or phase relationships (angular relationship) of the clutch halves 24, 25 relative to each other. The signals may be input in a unit 29 for rotational speed detection, slippage detection and/or slippage determination. The thusly detected slippage and/or rotational speed(s) can be used as a control criterion for the operation of the motor 15 and/or the brake 17. The slippage further can be used for the determination of the amount of the load.

As schematically illustrated in FIG. 3, the hysteresis clutch 26 and the gearing 16 can be arranged in a common gearing housing 30. It may be filled with oil that lubricates bearings and toothed wheels, as well as for cooling the hysteresis clutch 26.

Figure 4:
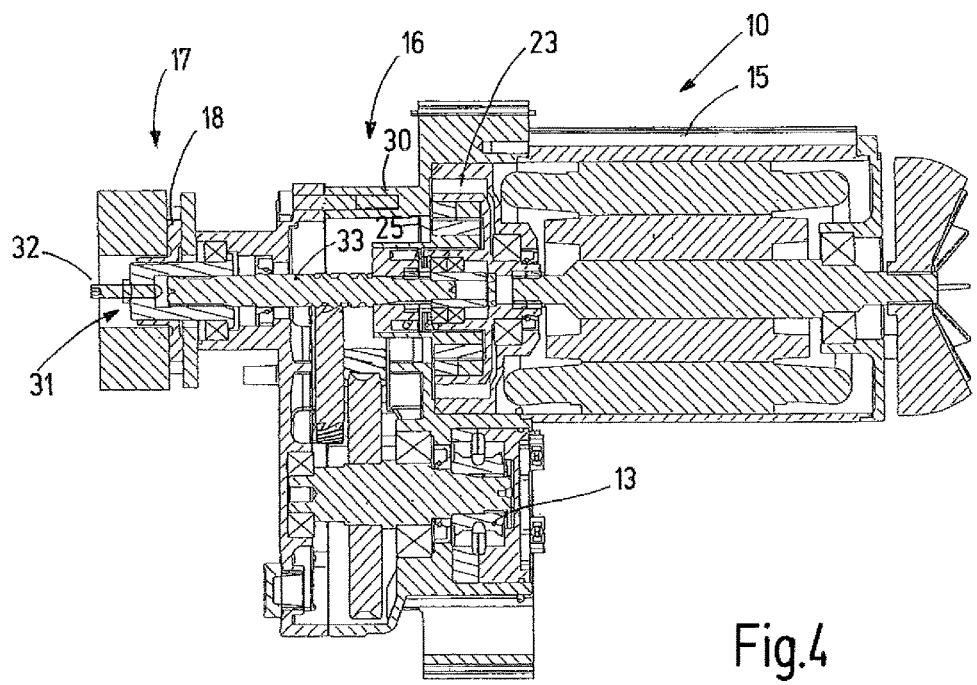
FIG. 4 is a transverse section of an illustrated embodiment of a hoist according to the invention.

FIG. 4 depicts in greater detail the design of the hoist 10 comprising the brake 17 on the gearing side. As is apparent here, the hoist 10 comprises an adjustment arrangement 31 for adjusting the hysteresis clutch 23. The adjustment arrangement 31 comprises an adjusting screw 32 that supports a shaft 33 connected to the gearing-side clutch half 25. By adjusting the axial position of the shaft 33, the relative axial positions of the clutch halves 24, 25 relative to each other and thus the size of the air gap are adjusted.

In addition to or as an alternative to the brake 17, it is possible to provide a brake 17a on the motor side, as depicted in FIG. 3. Preferably, the latter brake is configured as a disk brake comprising a brake disk 18a associated with brake blocks 19a, 20a, an electromagnet 21 and a return spring 22a. The electromagnet 21a is disposed for disengaging (venting) the brake 17a. In deenergized state, the brake 17a is engaged, i.e., it generates its maximum brake torque Mmax.

Figure 5:
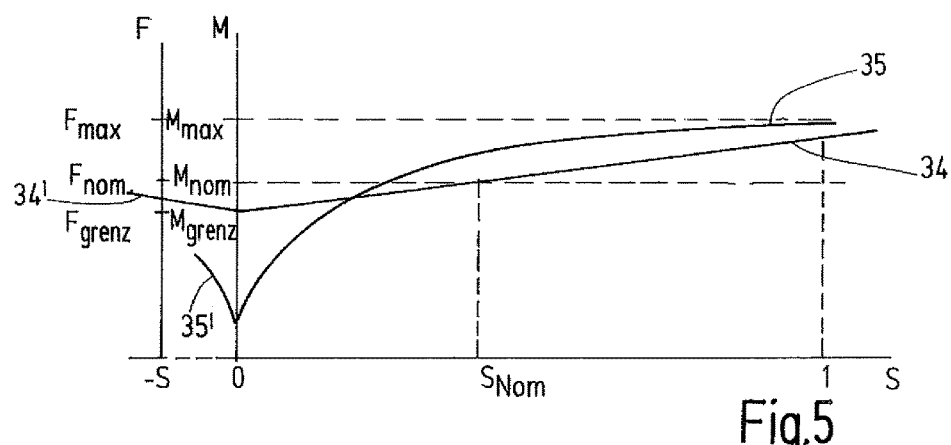
FIG. 5 is a torque/slippage characteristic curve of a first group of embodiments of the invention.

The following is a description of the function of an exemplary embodiment wherein the brake 17a does not exist and wherein the slip clutch arrangement 23 exhibits the characteristic 34 as in FIG. 5:

The hoist 10 is operable for moving loads that are connected to the pulling means or element 11. This can be accomplished on the free end of the pulling means 11 or via a loose roller arranged in a snatch block when the free end of the pulling means 11 is fastened to a fixed suspension point, for example on the gearing housing 30. When the motor 15 rotates, it transmits the driving torque—via the hysteresis clutch 23 and the gearing 16—to the pocket wheel 13 or another winding wheel in order to lift or otherwise move the load.

If the weight of the load is lower than a force limit Fgrenz, this may be accomplished without substantial slippage of the hysteresis clutch 25. However, if the load is greater than the force limit Fgrenz but lower than the nominal load Fnom, a slippage occurs on the hysteresis clutch 26. The force limit Fgrenz on the hysteresis clutch 23 corresponds to a torque limit Mgrenz. When this torque Mgrenz is reached, the slippage S is still just zero.

When the torque limit Mgrenz is exceeded, the slippage increases. Preferably, in doing so, the hysteresis clutch 26 exhibits a linear characteristic 34, i.e., the transmitted torque M becomes greater with increasing slippage S. When the nominal load Fnom has been reached, the nominal torque Mnom is applied to the hysteresis clutch 23, in which case the slippage Snom is the result. The nominal slippage Snom is between 0 and 1. For example, it may be greater than 5% or 10%. Preferably, however, said nominal slippage is selected in such a manner that the nominal load can still be lifted without interruption, however at a slightly reduced speed, in order to signal to the operator that the nominal load has been reached. If higher speeds are to be reached with the nominal load, the gear ratio may also be selected in such a manner that the nominal speed is being reached with the resultant slippage. The advantage of such a gear ratio selection is the fact that partial loads can be moved faster. As a result, the operating efficiency increases.

It should be noted that the torque/slippage characteristic 34 in the diagram of FIG. 5 is symmetrical in view of the vertical torque axis. This is shown by the branch of the curve 34' representing the negative slippage S.

It is further pointed out that the torque/slippage characteristic must not necessarily be linear. It may also deviate from the straight form as indicated in FIG. 5 by the torque/slippage characteristic 35, 35', so that maximum loads lower than half the nominal load Fnom already exhibit a slippage different from zero. Preferably, however, such characteristics are digressive in order to generate a maximum force Fmax at a slippage equal to 1, i.e., a blockage of the pulling means 11, said maximum force being limited to a safe value. This value may be, for example, 1.5 times, preferably 1.3 times, better yet only 1.2 times or 1.1 times, the nominal load Fnom.

Irrespective of whether the torque/slippage characteristic 34 is linear or whether the torque/slippage characteristic is non-linear, it is possible—by detecting the rotational speeds of the clutch halves 24, 25 by means of rotational speed sensors 27, 28—to determine the slippage S and draw a conclusion regarding the operating status of the hoist 10 or to influence the operating status. For example, it is possible to lower the rotational speed of the motor 15 if the nominal slippage sNom is exceeded. As a result of this, it is possible to prevent any lifting of loads that are greater than the nominal load FNom, without, however, completely switching off the motor 15.

Furthermore, by setting the torque limit Mgrenz lower than the torque limit Mnom a smooth operation of the hoist 10 can be achieved even if the motor 15 is operated without an inverter with mains current at a fixed rotational speed.

Figure 7:
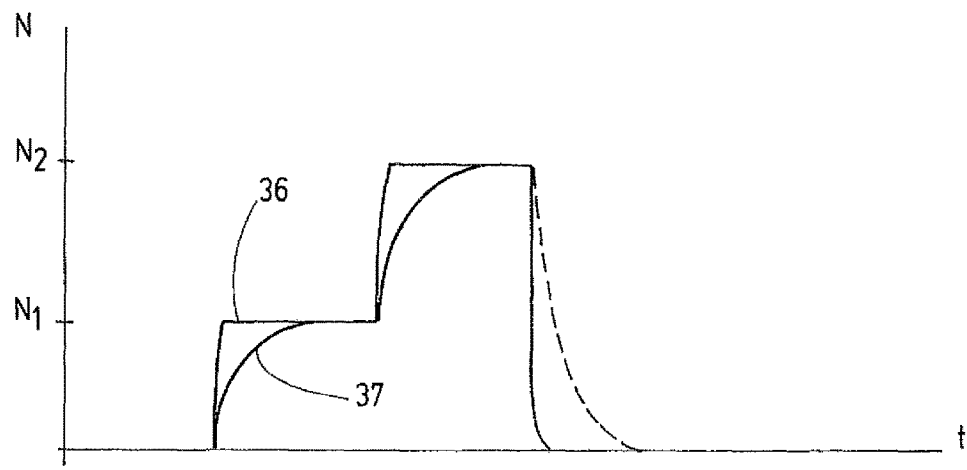
FIGS. 7 and 8 are time-dependency diagrams of the rotational speeds of the input and output of the clutch with various loads.

In that regard, FIG. 7 illustrates the switching on of the motor 15 that can be operated at two rotational speeds N1, N2. The characteristic 36 shows the progression of the rate of revolutions of the motor and thus the rate of revolutions of the clutch half 24. Characteristic 37 shows the progression of the rate of revolutions of the clutch half 25. While the load L is accelerated, the slippage S briefly increases, so that the rate of revolutions of the gearing-side clutch half 25 follows the rate of revolutions of the motor 15 at a delay. In this manner, a shock-like stress of the pulling means 11, the gearing, or the supporting structures of the hoist, is prevented or minimized. The effect is also analogous in the case of a motor 15 that is to be driven at only one single rotational speed. As will be apparent, the hysteresis clutch 26 reaches the slippage 0 after a certain period of time, i.e., the load is smaller than the load limit Fgrenz.

Figure 8:
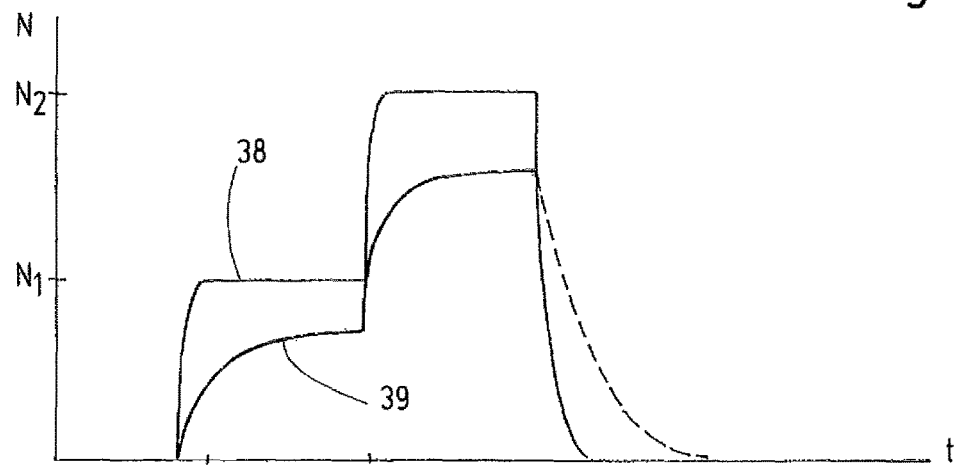

FIG. 8 shows the operation with a weight of the load L that is greater than the load limit Fgrenz. While the rotational speed of the motor changes almost surge-like (characteristic 38), the rotational speed of the gearing-side clutch half 25 follows clearly delayed, without ever reaching the rotational speed of the motor. Consequently, the operation of the hoist 10 is particularly gentle as the nominal load Fnom is being approached.

With the use of the motor-side brake 17a—in combination with the gearing-side brake—a shock-like stress of the pulling means 11 can also be prevented or minimized during the stopping phase. If two brakes are being used, the brakes must be activated in such a manner that, first, the motor-side brake 17a is braking (engaging) and, subsequently—delayed—the gearing-side brake 17 is engaging. After the motor-side brake 17a has engaged (applied), the motor rotational speeds 36 and 38 drop rapidly. The load is decelerated gently by the hysteresis clutch 26 that now acts like a hysteresis brake. After the delayed engagement of the gearing-side brake 17 the load is held safely by said brake. The hoist 10 comprising two brakes 17, 17a enables the controlled lowering of the load in a simple manner. While the motor-side brake 17a remains applied, the gearing-side brake 17 can be manually released, and the hysteresis clutch 26 can be adjusted in the direction of a lower torque by trial, until the load can be lowered in a controlled manner by using the hysteresis clutch 26 as a hysteresis brake.

Figure 9:
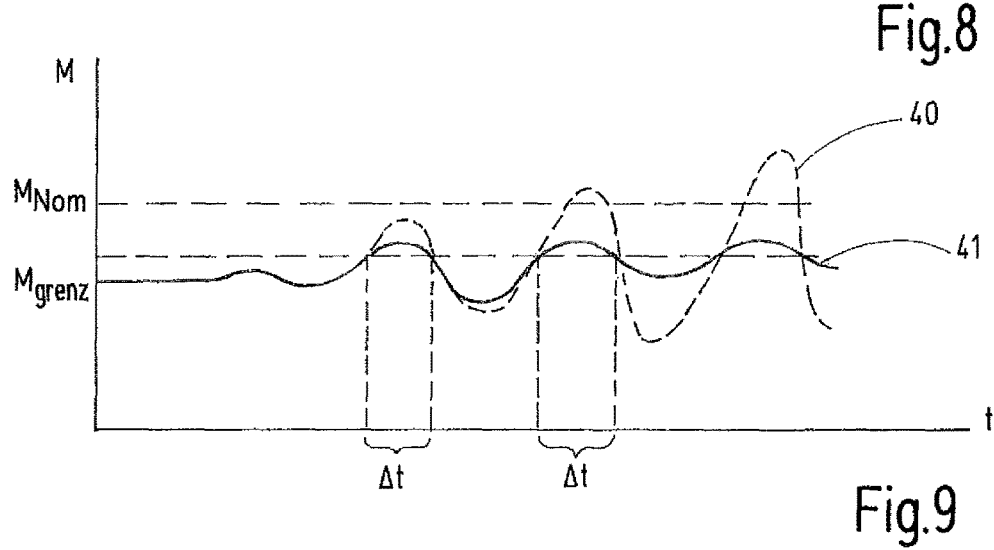
FIG. 9 is a time-dependency diagram of the torque on the slip clutch of the illustrated hoist when load vibrations are occurring.

FIG. 9 illustrates a further useful effect with the hoist 10. In this regard, a torque/time diagram is shown that characterizes the progression of the torque M on the hysteresis clutch 26 in the case of a stimulation of vibration. Such a stimulation of vibration can be accomplished, among other things, by the polygonal effect of the pocket wheel 13. If the rotating pocket wheel 13 having a polygonal effect stimulates the chain 12 at a frequency that corresponds to the resonant frequency of the tensioned chain 12, it is possible for severe oscillations to occur. In FIG. 9, dashed line 40 shows a resulting progression of torque, wherein the nominal torque Fnom and thus the corresponding nominal load Fnom would be exceeded. However, the torque on the hysteresis clutch 23 represented by the solid line 41 repeatedly reaches a zone between the torque limit Mgrenz and the nominal torque Mnom in time segments Δt. In this zone, the slippage S is different from zero, so that energy is withdrawn from the vibration process and converted into thermal energy. As a result, the vibration is effectively attenuated so that it stops completely, or that at least the nominal torque Mnom and thus the nominal load Fnom are not exceeded.

Figure 6:
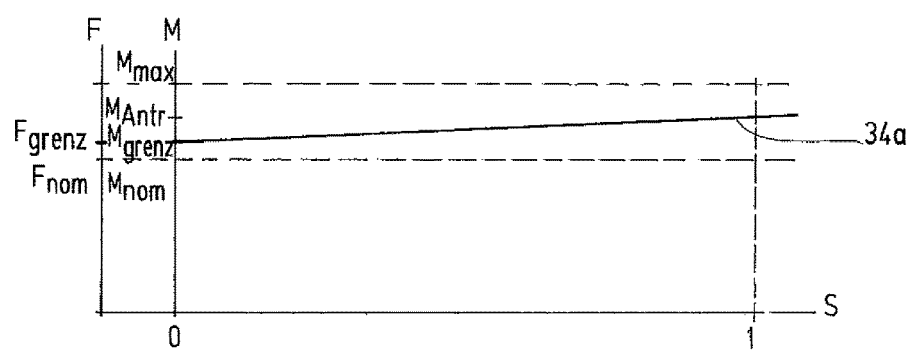
FIG. 6 is a torque/slippage characteristic curve of a second group of embodiments of the invention.

Reference to still another embodiment if, as in FIG. 6, the torque/slippage characteristic in accordance with curve 34a is set in such a manner that the torque limit Mgrenz is above the nominal torque Mnom, the hysteresis clutch 26 does not slip in normal operating mode. In this case, the gearing-side brake 17 may be omitted and only the motor-side brake 17a may be used. Also, in this case—even though to a reduced extent—the hysteresis clutch 26 may be disposed for shock absorption when the motor 15 performs rotational speed surges as in FIG. 7 or 8 or when a stimulation of vibration exists as shown by FIG. 9. In addition to the soft start, it is also possible to manually perform the aforementioned lowering of the load, in which case the motor 15, is blocked, e.g., by the motor-side brake 17a and the hysteresis clutch 26 is used as a hysteresis brake.

However, if the torque limit Mgrenz of the hysteresis clutch 26 is set above the nominal torque Mnom, said clutch can also be used in exemplary embodiments, wherein only the brake 17 or both brakes 17, 17a are provided. A particular advantage resulting therefrom can be understood from the illustration as in FIG. 2. There, the hoist 10 (left) has a safety-oriented section that comprises the brake 17, its control unit 42, and, optionally, switching arrangements such as, for example, an emergency shutoff push-button 43. Via an operative connection that is indicated in dashed lines in FIG. 2, the control arrangement 42 can affect the optionally provided second brake 17a and/or the control of the motor 15, the control not being specifically designed in view of safety features, for example, in order to engage the brake 17a and to stop the motor 15. As depicted, the hoist 10 comprises—as shown on the left side of the vertically dashed line 44—a safety-oriented region and—as shown on the right side thereof—a not safety-oriented region. In this embodiment, the brake 17 exhibits dimensions such that it is able to absorb the torque (maximum Mnom) derived from the load L as well as the torque MAntr additionally applied by the drive train 14. The latter is the maximum torque that can be generated by the motor 15 or the maximum torque that can be transmitted by the slip clutch arrangement 23, depending on which is lower. If the brake 17 is capable of at least absorbing the sum of torques obtained from the load torque Mnom and the driving torque MAntr, the brake can stop the load in any event, i.e., even if the motor 15 rotates uncontrolled forwardly or reversely.

The control arrangement 42 represents a manually controlled emergency shutoff arrangement. However, the control arrangement 42 can also be controlled by control signals, e.g., by rotational speed signals, slippage signals, load signals or the like, the signals being output, e.g., by one or more rotational speed sensors 27, 28.

From the foregoing, it can be seen that the hoist 10 in accordance with the invention has a drive train 14 that comprises a slip clutch arrangement 23 with the hysteresis clutch 26. The latter transmits the torque between the motor 15 and the gearing 16 in a frictionless manner—in forward as well as in reverse directions. The hysteresis clutch 23 forms an unbranched torque gearing path between the motor 15 and the gearing 16. The hysteresis clutch 26 of the hoist 10 acts as a vibration damper, allows the controlled emergency lowering of a load and acts as a safe torque limit in the case of an emergency shutoff while a load is being stopped. Furthermore, it may be disposed for load indication by reducing the load lifting speed before the nominal load is reached or in case of an overload.

LIST OF REFERENCE SIGNS

10 Hoist
L Load
11 Pulling means
12 Chain
13 Pocket wheel
14 Drive train
15 Motor
16 Gearing
17, 17a Brake
18, 18a Brake disk
19, 20, 19a, 20a Brake blocks
Mmax Maximum torque
Mnom Nominal rotational torque
MAntr Maximum driving torque
Mgrenz Clutch torque at which slippage begins
Fgrenz Load at which clutch slippage begins
Fnom Nominal load
21, 21a Electromagnet
22, 22a Spring
23 Slip clutch arrangement
24 Motor-side clutch half
25 Gearing-side clutch half
26 Hysteresis clutch
27, 28 Rotational speed sensors
29 Control unit
30 Gearing housing
31 Adjustment arrangement
32 Adjusting screw
33 Shaft
34, 34', 34a Torque/slippage characteristic—linear
35, 35' Torque/slippage characteristic—non-linear
36 Motor rotational speed
37 Rotational speed of the gearing input shaft
38 Motor rotational speed
39 Rotational speed of the gearing input shaft
40, 41 Line
42 Control arrangement
43 Emergency shutoff push-button
44 Line

The invention claimed is:

1. A hoist for moving loads (L) no greater than a nominal load (Fnom) comprising:
a drive train including a motor and a gearing connected to a pulling element on an output side of the gearing for taking up the load (L), the motor being controlled by an inverter and operating at variable speeds in a forward direction and in a reverse direction;
a slip clutch arrangement arranged in the drive train, the slip clutch arrangement disposed directly between the motor and an input shaft of the gearing, the slip clutch arrangement operating in the forward and reverse directions;
a brake connected to the drive train and operable for holding the load (L) when the brake is in an engaged state;
said slip clutch arrangement including a hysteresis clutch comprising permanent magnets that provides an unbranched torque transmitting drive path in said drive train in both the forward and reverse directions; and
said slip clutch arrangement having a torque limit (Mgrenz) at which said slip clutch arrangement begins to slip which corresponds to a torque limit (Fgrenz) that is greater than the nominal load (Fnom).

2. The hoist of claim 1 in which said slip clutch arrangement has a symmetrical torque/slippage characteristic with respect to both the forward and reverse directions of the drive train.

3. The hoist of claim 1 in which said hysteresis clutch is arranged between said motor and said gearing such that the permanent magnets rotate in the forward and reverse directions with the motor, a gearing-side clutch half is connected to the input shaft of the gearing, and an adjustable gap exists between said permanent magnets and the gearing-side clutch half.

4. The hoist of claim 1 in which said brake includes at least one spring active in an engagement direction, and a release arrangement that acts against the spring when said spring is activated.

5. The hoist of claim 1 in which said brake is electrically releasable.

6. The hoist of claim 1 in which said drive train is operable for raising and lowering said load (L) depending on a direction of rotation of the motor in the forward or reverse directions while torque is transmitted through the hysteresis clutch, and said brake is releasable when loads (L) are being lifted.

7. The hoist of claim 1 in which said drive train is operable for raising and lowering said load (L) depending on a direction of rotation of the motor in the forward or reverse directions while torque is transmitted through the hysteresis clutch, and said brake is releasable when loads (L) are being lowered.

8. The hoist of claim 1 in which said brake is arranged on a side of said gearing remote from said motor.

9. The hoist of claim 1 in which said brake exhibits a maximum brake torque (Mmax) that corresponds to a torque applied onto the gearing by a load (Fmax) that is greater than a nominal load torque (Mnom) applied onto the gearing by a nominal load (Fnom).

10. The hoist of claim 9 in which said maximum brake torque (Mmax) is at least as great as a sum of the nominal load torque (Mnom) and a driving torque (MAntr), wherein the driving torque (MAntr) is the maximum torque of the motor or the maximum torque that can be transmitted by the slip clutch arrangement to the gearing.

11. The hoist of claim 10 in which said brake is connected to an emergency shutoff control.

12. The hoist of claim 1 in which said slip clutch arrangement has a torque limit (Mgrenz) at which said slip clutch arrangement begins to slip and which corresponds to a load limit (Fgrenz) that is lower than a nominal load (Fnom).

13. The hoist of claim 1 in which said brake is arranged on said drive train on a side of said motor remote from said gearing.

14. The hoist of claim 1 in which said gearing is a non self-locking gearing.

* * * * *